Sept. 15, 1925.  
C. J. EVERETT  
1,553,809  
RECORDING MECHANISM FOR VEHICLES  
Filed Feb. 27, 1922   4 Sheets-Sheet 1

Inventor  
Charles J. Everett  
By his Attorneys  
Prindle, Wright & Vinall

Sept. 15, 1925.
C. J. EVERETT
1,553,809
RECORDING MECHANISM FOR VEHICLES
Filed Feb. 27, 1922     4 Sheets-Sheet 3.
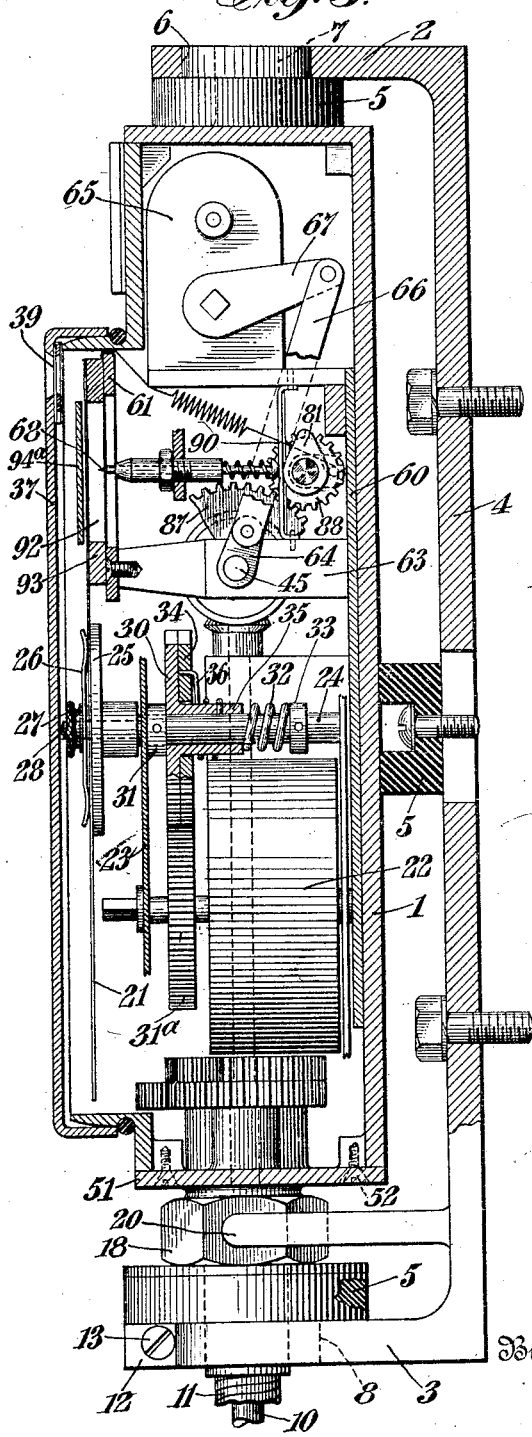
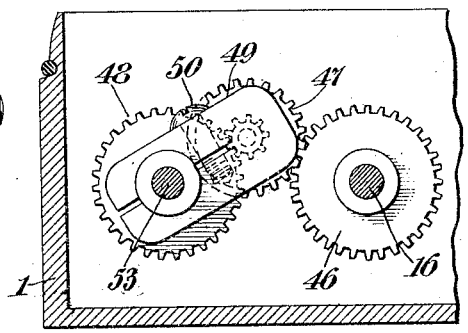
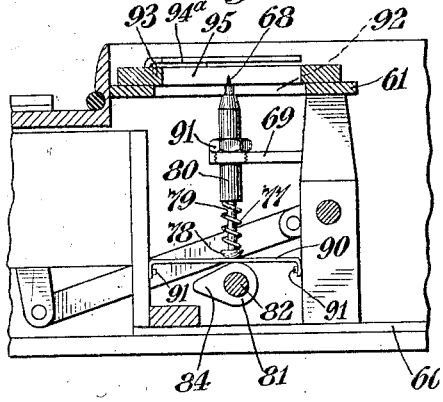
Inventor
Charles J. Everett
By his Attorneys
Prindle, Wright & Small

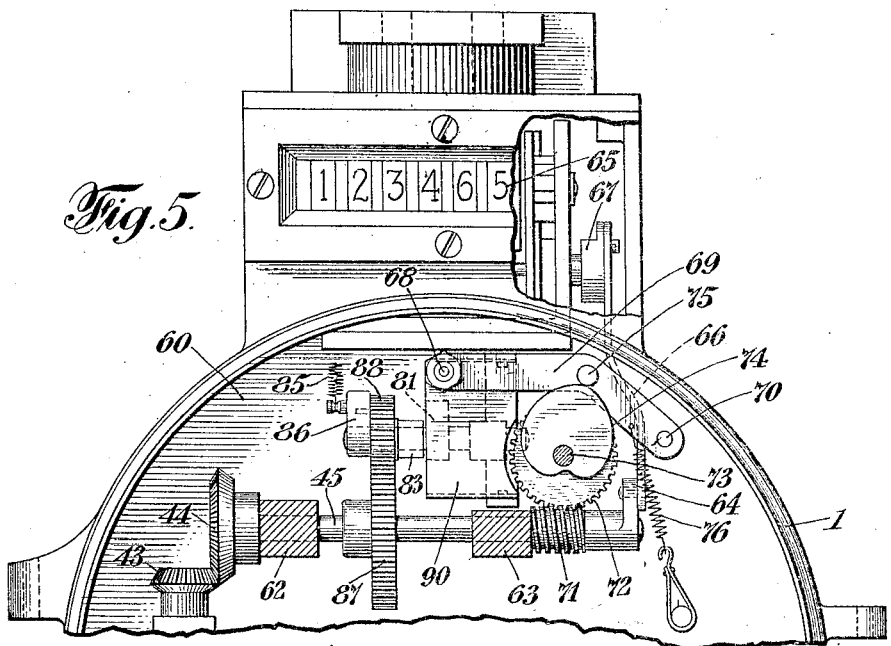
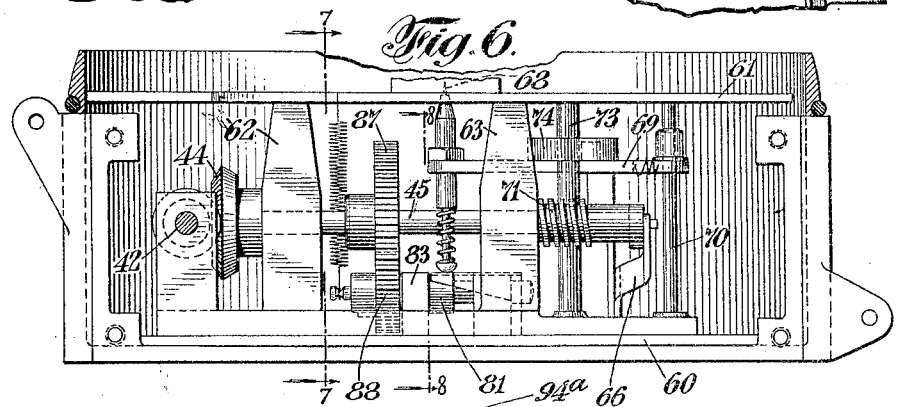
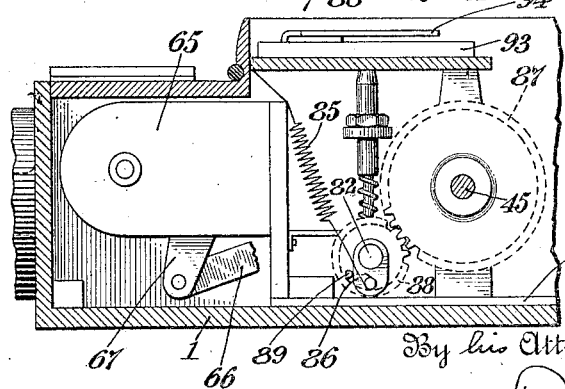

Patented Sept. 15, 1925.

1,553,809

UNITED STATES PATENT OFFICE.

CHARLES J. EVERETT, OF TENAFLY, NEW JERSEY.

RECORDING MECHANISM FOR VEHICLES.

Application filed February 27, 1922. Serial No. 539,382.

*To all whom it may concern:*

Be it known that I, CHARLES J. EVERETT, a citizen of the United States, a resident of Tenafly, in the county of Bergen and State of New Jersey, have invented a certain new and useful Recording Mechanism for Vehicles, of which the following is a specification.

The invention relates to a mechanism for indicating automatically upon a record sheet the distance traveled by a vehicle in any desired period of time, the speed of travel of the vehicle at different intervals during such period, the intervals during which the vehicle remains stationary, etc., for the purpose of enabling a person having access to the record sheet to obtain full knowledge of the use to which the vehicle was put during the period covered by such sheet. A recording mechanism of the above type is particularly useful in the case of trucks or other commercial vehicles for the purpose of giving information as to how long the vehicle remained idle after being taken out by the driver, the periods of time over which it was idle, the distance traveled, and the speed at which the vehicle was operated.

A recording mechanism of the above character may be driven from any convenient moving part on a vehicle, but since the distance covered by the vehicle in its travel will depend upon the size of wheels employed, it is difficult to provide a single instrument which will record accurately in regard to vehicles having wheels of different diameters.

One object of the present invention is to provide a recording mechanism which may be applied to vehicles having different sized wheels, and which by simple adjustment may be arranged to record accurately the movement of vehicles having wheels of different diameters.

Another object is to construct the mechanism in such manner that the different parts will be readily accessible for adjustment, removal or repair without unnecessary demounting or disturbance of the remainder of the structure.

Another object, when the invention is used for making a perforated record sheet, is to control the movement of the perforating needle or stylus in such manner as to insure that the motion of the stylus will be sufficiently powerful to properly puncture the sheet at the desired point, and yet not sufficient to tear or stick. In other words, the actuating mechanism for the stylus or needle is certain and positive in its action, and not dependent upon the delicate adjustment of springs or the like which particularly after continued use might tend either to move the needle too far into the sheet so as to tear it, or cause the needle to stick, or become so weak that the needle would not properly perforate at each stroke.

Another object is to construct the mechanism so with relation to the record sheet that the same will serve as a clock for the driver, but without disclosing to him the record of the movements of the vehicle contained upon the sheet.

Another object of the invention is to so support the recording mechanism as to minimize liability of injury thereto on account of vibrations or shocks.

The invention also aims to eliminate as far as possible inaccuracies in the record due to back lash or play in the gearing employed, particularly the gearing of the time controlled parts of the mechanism.

Further objects and advantages of the invention will be in part obvious and in part specifically pointed out in the description hereinafter contained, which, taken in connection with the accompanying drawings, discloses a preferred embodiment thereof; such embodiment, however, is to be considered merely as illustrative of its principle. In the drawings:

Fig. 3 is a transverse sectional view of the mechanism.

Fig. 4 is a section on line 4—4 of Fig. 2 looking in the direction of the arrows.

Fig. 5 is a front view of the section of the mechanism which controls the record-making elements, with the top plate removed.

Fig. 6 is a bottom view of the elements appearing in Fig. 5.

Figure 1:
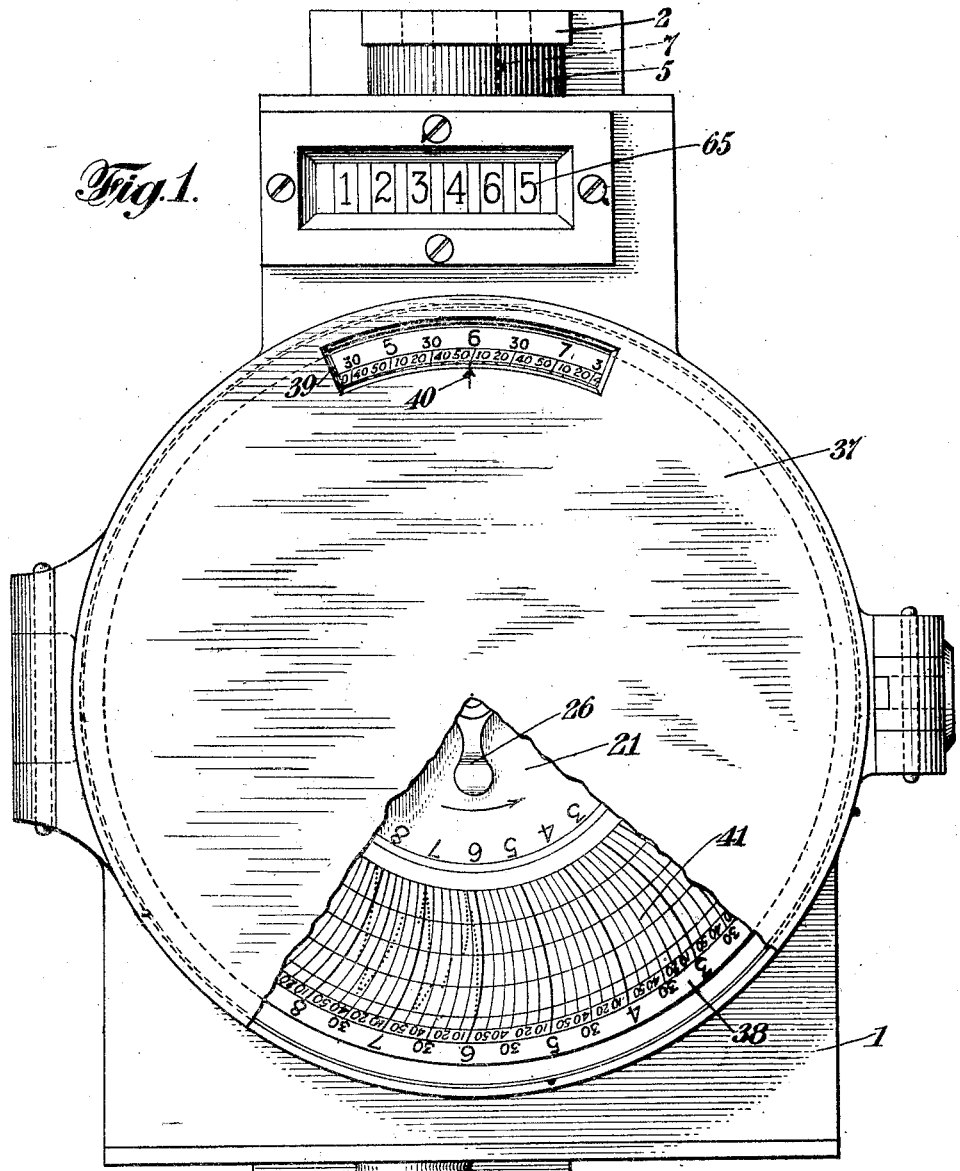
Fig. 1 is a front view of a recording mechanism constructed in accordance with the invention, a portion of the cover thereof being cut away to show one type of record sheet such as may be used in connection therewith.

Figs. 7 and 8 are fragmentary sectional views taken respectively on line 7—7 and 8—8 of Fig. 6 looking in the direction of the arrows.

Referring to the drawings, I have illustrated a recording device of the above character contained as a whole within a casing 1, which may be mounted in any convenient location upon a moving vehicle. In order to relieve the recording mechanism from the vibrations and shocks incident to the motion of the vehicle, I prefer to provide a resilient support for the casing to hold the same yieldably in position. In the present instance the casing 1 is received within a bracket shown as channel shaped, and having upper and lower flanges 2 and 3 respectively (Fig. 3) connected by a web 4, and the resiliency is provided by means of spacing members 5 of resilient material such as rubber, interposed between the flanges and web of the bracket, and the walls of the casing respectively adjacent.

In the illustrated embodiment of the invention the flange 2 of the bracket is provided with a hole 6 adapted to receive the reduced upper end of the corresponding spacing member 5, which latter encloses a lug 7 on the upper end of the casing. The lower flange 3 of the bracket is provided with a slot 8 adapted to receive the reduced outer end of spacing member 5, and such spacing member is made annular in shape to receive a collar 9 through which the driving connections for the recording mechanism may be led to the casing 1 which contains the record-making elements.

It will be understood that the recording mechanism may be driven from any convenient moving part on the vehicle, from which part suitable driving connections, such as a flexible shaft 10, enclosed by sheath 11, will extend through collar 9 to casing 1.

I prefer to so arrange the casing that tampering with the driving mechanism by the drivers of vehicles will be minimized. In the present instance, flange 3 of the bracket is provided with lugs 12 on opposite sides of slot 8, and a bolt or the like 13 is held in place by a suitable seal 14 which is passed through the lugs to hold in collar 9 previously mentioned, and prevent surreptitious interference with the driving connections of the recording mechanism.

As shown, the flexible shaft 10 is forced into a sleeve 15 (Fig. 2) within collar 9, and such sleeve is keyed to spindle 16, which constitutes the driving member of the recording mechanism. To facilitate making and detaching the driving connections, the adjacent wall of casing 1 may be provided with a threaded hub 17, against which collar 9 is forced by means of a nut 18 engaging the hub and bearing upon an annular flange 19 on collar 9. After the driving connections have been completed with the casing detached from its bracket, the spacing member 5 at the upper end of the casing may be forced within hole 6, and the lower spacing member 5 seated in slot 8 to fix the casing in the bracket. Bolt 13 and seal 14 will then be placed in position, and if desired suitable members such as the projections 20 on one or more sides of the nut 18, may be provided to prevent loosening of the nut unless the seal 14 be broken. The record-sheet 21 (Figs. 1 and 3) is of the rotary type in the present instance, being actuated by any suitable time-controlled mechanism such as the clockwork 22 indicated conventionally in Fig. 3, the latter being ordinarily mounted in a separate casing 23, detachably secured to casing 1 in order to permit independent removal of the clockwork at any time without disturbing the other elements of the recording mechanism. In the present instance, the record-sheet 21 is mounted upon a spindle 24 (Fig. 3) by means of a disc 25 fixedly carried by the shaft, against which disc the record-sheet is detachably held in any suitable manner, for example, by means of a cross-shaped spring 26 adapted to be forced against the record-sheet by a thumb screw 27 on the threaded outer end 28 of spindle 24. In order to insure that the record-sheet will be mounted in fixed angular relationship to spindle 24, devices such as the pins 29 carried by disc 25 are provided to engage corresponding holes in the record sheet; thus, if the latter be removed, the non-symmetric location of the pins with regard to spindle 24 will insure that the corresponding holes on the sheet will engage pins 29 only when the sheet is in its proper position on the spindle, as well as to insure that the sheet does not slip during the operation of the mechanism, and to cause one or more duplicate records, which may be superimposed, to accurately register when taking several simultaneous records.

I prefer to drive the record sheet 21 frictionally from time-controlled mechanism 22 in order to permit the record-sheet to be initially adjusted to an angular position corresponding to the time of day when it is inserted; in the illustrated embodiment of the invention, spindle 24 is driven by a gear 30 loosely mounted upon the spindle, but pressed against a collar 31 thereon by means of a coil spring 32 (Fig. 3) acting between the gear and a further collar 33 affixed to spindle 24. Thus spring 32 will insure that the record-sheet is turned at all times in accordance with the movement of the clockwork, but the sheet may also be independently manually turned whenever desired. The gear 30 above-mentioned is shown as driven by a further gear 31ª carried by the clockwork. Gears of the above nature as at present manufactured for clockwork, ordinarily engage so loosely as to cause a substantial amount of play or looseness which in a mechanism of the present type might be sufficient to cause substantial inaccuracies in the record made upon sheets 21, particularly where the mechanism is subjected to vibrations. It is preferred accordingly to arrange the mechanism to eliminate play or back lash between gears 30 and 31ª; in the illustrated embodiment the gear 30 is provided with a section 34 mounted loosely upon hub 35 of gear 30, and urged to rotate in regard to 30 by a spring 36 (Fig. 3) in such manner that the teeth on gear 31ª are gripped on opposite sides by the teeth on gear 30 and its movable section 34. As the clockwork 22 rotates, each tooth on the gear 31ª will be firmly held between adjacent teeth of gear 30 and gear section 34, so that the record-sheet will be held in proper angular position at all times.

As appears most clearly in Figs. 1 and 3, the record-sheet is located underneath a suitable cover 37 associated with casing 1, and which may be understood as suitably locked in position to prevent access to the record-sheet by unauthorized persons. The cover also preferably obstructs view to the record-sheet as a whole, but I prefer to so construct the mechanism that certain portions of the record-sheet will be visible at all times to the driver of the vehicle, whereby the mechanism may be utilized as a clock in addition to its other purposes. Referring to Fig. 1, one portion of the record-sheet, in the present instance, the outer annular portion 38, carries time denoting indicia, the illustrated record-sheet being graduated to cover a period of twenty-four hours; and cover 37 is provided with a window 39, past which moves the portion 38 of the sheet in such manner, that, if the record-sheet be initially adjusted to an angular position corresponding to the time of day, a suitable reference point such as arrow 40 (Fig. 1) will thereafter indicate the time of day.

Another portion 41 of the record sheet is given up to distance denoting indicia, and, as above mentioned, is preferably hidden by the cover when the mechanism is in use. In the present form of the invention this portion 41 is the annular part of the sheet immediately within the portion 38 thereof previously mentioned. The portion 41 of the sheet, in the present form of the invention, is utilized in connection with a stylus which moves back and forth radially of the record-sheet in accordance with the distance traveled by the vehicle, such stylus being arranged to mark upon the record-sheet its position at various times, so that the distance-controlled motion of the stylus in combination with the time-controlled motion of the record-sheet, gives a history of the movements of the vehicle.

In the record-sheet shown the stylus is arranged to perforate the sheet intermittently, and travels from an inner position to extreme outer position every two miles. Thus, the record shown in Fig. 1 will indicate that the vehicle traveled three miles between 6 and 6.20; was stationary between 6.20 and 6.30; traveled about half a mile in a few minutes immediately after 6.30, was stationary until shortly after 6.40, etc. The record, therefore, shows the exact time at which use of the vehicle began, the time and duration of all stops of the vehicle, the distance traveled, and the speed at which the vehicle was operated at different times, it being noted that the faster the speed of travel of the vehicle, the more closely will the record follow the radial ordinates on the record-sheet which indicate time.

The record-making elements of the mechanism are illustrated more particularly in Figs. 2, 5, 6, 7 and 8, the present embodiment of the invention employing a perforating needle or stylus which is actuated by the driving member 16 to move back and forth substantially radially of the record-sheet, and perforate it intermittently as above described.

Figure 2:
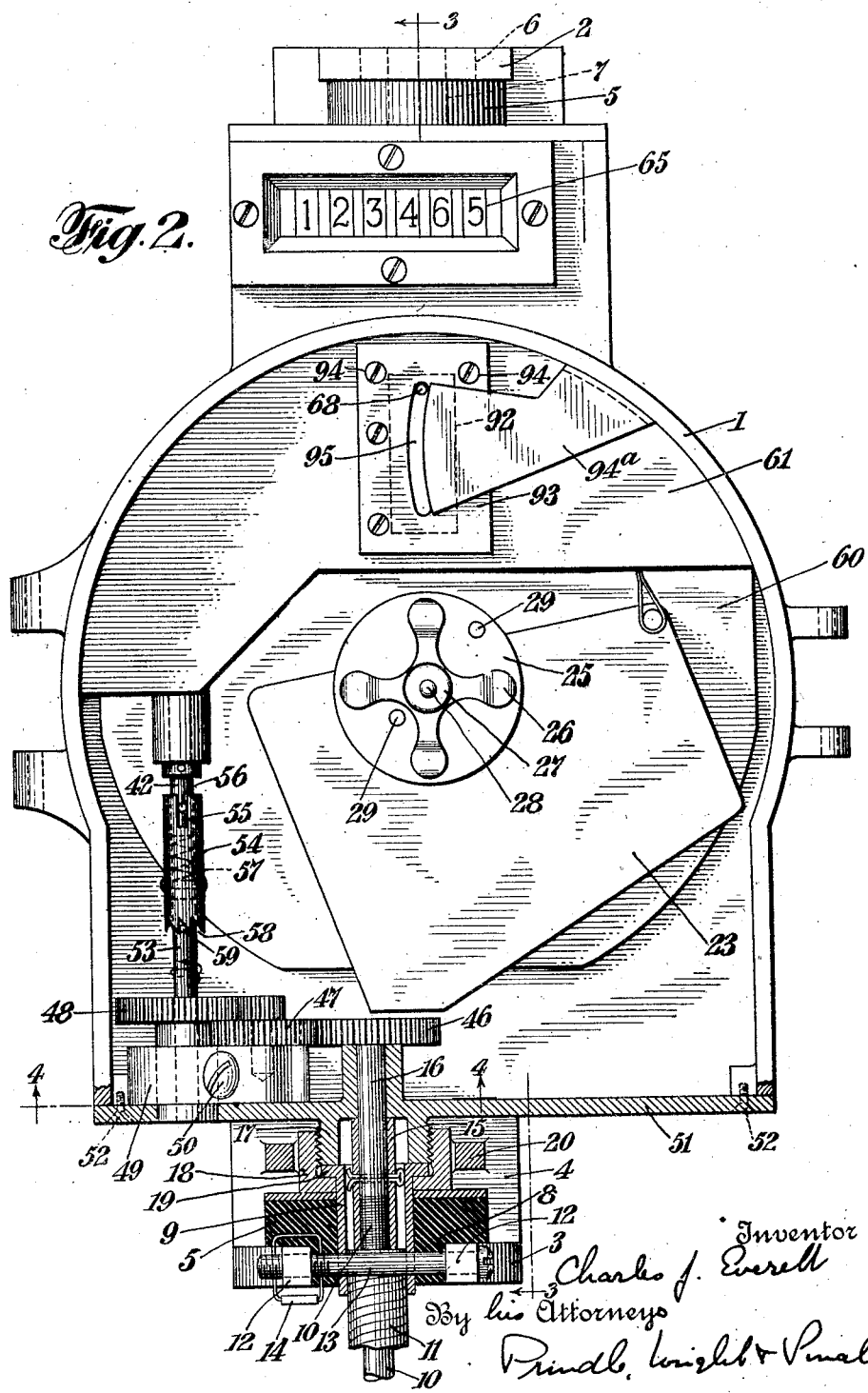
Fig. 2 is a view similar to Fig. 1, but with the cover and record sheet removed to show the interior of the mechanism, certain parts also being cut away to show more clearly the transmission elements by which the mechanism is actuated.

The recording mechanism ordinarily will be driven from some rotating part of the vehicle, and since the distance traveled by the vehicle varies in accordance with the size of its wheels, I prefer to provide for changes in the speed ratio between the driving member 16 and the recording elements in such manner that the mechanism will not be restricted in its use to a vehicle having wheels of the same size, but may be readily adjusted to record accurately for different vehicles. In the present instance the above changes in speed ratio are made possible by a train of gears interposed between the driving member 16 and a shaft 42, which latter is connected through bevel gears 43 and 44 (Fig. 5) to a further shaft 45 and other parts later to be described. Referring more particularly to Figs. 2 and 4, the train of gears above-mentioned in the present instance consists of a gear 46 meshing with the large section of a stepped gear 47, the smaller section of which engages a gear 48, which latter turns shaft 42. It will be understood that the diameters of the above-mentioned gears are so selected that the shaft 42 turns at the proper speed to actuate the stylus at the correct rate for a vehicle having wheels of a given diameter. The gears of the train above-mentioned are then arranged to permit the speed ratio to be changed. In the present instance gear 47 is supported in an arm 49 capable of being adjusted as by screw 50 to swing in an arc about the axis of gear 48 as a centre, thus enabling the distance between gear 47 and the axis of gear 46 to be varied, while the distance between gear 47 and the axis of gear 48 remains constant during all adjustments, so that the smaller step of gear 47 meshes at all times with gear 48. Depending upon the diameters of wheels of any particular vehicle, the gear 46 may then be chosen of the proper diameter to give the correct speed ratio by adjusting arm 49 to locate gear 47 at the proper distance to engage the teeth on a gear 46 of the correct size. Although it is not essential, I prefer to make the adjustment in speed ratio by changing the initial gear 46 of the train, since the proper dimeter of this gear for different sized wheels will vary directly with the diameter of the vehicle wheel, it being possible to provide each recording mechanism with wheels having 30, 32 and 34 teeth, which may be used selectively in the gear train to give the proper speed ratio for vehicles having 30, 32 and 34 inch wheels respectively.

In order to facilitate the adjustment of the motion transmitting devices to give the proper speed ratio, I prefer to mount the gears upon a common supporting base 51, which is detachable from the remainder of the mechanism; in the present instance, this base member 51 constitutes one wall of the casing for the mechanism, and is detachably secured in position by screws 52 (Fig. 2). Thus the gear train may be easily removed from the casing and a gear 46 of proper diameter inserted. The shaft 42 also preferably is made in detachable sections, including a section 53 (Fig. 2) detachable with the wall 51, so that when this wall is again affixed to the casing the section 53 will automatically engage with the remainder of shaft 42. In the present instance, the detachable connection above-mentioned is utilized to provide a ratchet in the drive of the record-making elements in order that backward movements of the vehicle will not affect the recording mechanism. As shown, a sleeve 54, having a slot 55 therein, engages over a pin 56 on the end of shaft 42, and is pressed toward the detachable section 53 of such shaft by a suitable spring 57. At the outer end of sleeve 54 are ratchet teeth 58 which engage one or more pins 59 on section 53 of the shaft with the result that the record-making elements are turned only when section 53 of the shaft moves in a forward direction.

I prefer to mount the record-making elements of the mechanism upon a common supporting plate 60 (Figs. 2, 3, 5 and 6) in order that this part of the mechanism may be independently removed as a unit whenever desired without requiring disassembling of the mechanism as a whole, and in the present instance certain of the rotatable members constituting the record-making elements are journaled between this supporting plate 60 and a top plate 61 (Figs. 2, 3 and 6).

The shaft 45 previously mentioned is journaled in suitable posts 62 and 63 extending between the plates 60 and 61, and if desired a crank 64 or the like (Figs. 3 and 5) may be provided to drive an odometer, indicated conventionally at 65. As shown, crank 64 drives a link 66 connected to an arm 67 on the odometer.

The needle or stylus 68 is carried by an arm 69 pivoted on a rod 70 extending between the plates 60 and 61 previously mentioned, and proper radial movements are imparted to the stylus by motion transmitted to arm 69 through the shaft 45. In the present instance, a worm 71 on shaft 45 (Figs. 5 and 6) drives a worm wheel 72 on shaft 73 extending between the plates 60 and 61, such shaft 73 also carrying a cam 74, against which a lug 75 on arm 69 is continuously pressed by means of a spring 76. The cam 74 will be understood as being of suitable shape to oscillate the arm 69 and thus move stylus 68 back and forth uniformly according to the distance traveled by the vehicle. As above stated, in the present record-sheet the amplitude of oscillation of arm 69 represents a distance of two miles tranveled by the vehicle.

In the illustrated embodiment of the invention a stylus of the reciprocatory type is employed which punctures the record-sheet intermittently while the vehicle is traveling, the stylus being normally held in retracted position by means of a spring 77 (Fig. 8) which works between the head 78 of a plunger 79 moving with the stylus, and the lower end of a sleeve 80, which slidingly receives the stylus.

If the resiliency or recoil of a spring be relied upon to reciprocate the stylus during its puncturing movements, it is difficult to so balance the forces applied to the stylus, as well as to maintain balance during continuous use, that the stylus will be projected powerfully enough to insure proper perforation of the record-sheet and yet avoid tearing and sticking. I therefore prefer to actuate the stylus positively so to speak by parts having sufficient power and uniform action to make the stylus reliable in operation. In the present embodiment, the stylus is operated by an intermittently rotated cam member 81 (Fig. 8) on a shaft 82 journaled in lugs 83 extending up from plate 60, the cam member 81 having a portion 84 adapted to advance or raise the stylus as shaft 82 rotates, and cause it to puncture the record-sheet. The motion of shaft 82 is preferably accelerated during the period in which raised portion 84 advances the stylus. Referring more particularly to Figs. 5 and 7, this acceleration is accomplished in the present instance by means of a spring 85 acting upon a crank arm 86 on shaft 82, with the result that with each half revolution spring 85 is stretched during one-half revolution, and pulls crank arm 86 around quickly during the succeeding half revolution to actuate the stylus by rapid turning of a cam member 81 supplemented by the inertia of the rotating parts. Shaft 82 is driven by means of a gear 87 on shaft 45, which meshes with pinion 88 mounted loosely on shaft 82, and carrying a suitable projection such as pin 89 (Fig. 7) adapted to engage behind crank arm 86 to rotate it over one-half a revolution until spring 85 accelerates the rotation of such shaft during the remaining fraction of the revolution as above stated. It is found that the actuation of the needle by a positively driven device of the above nature brings about a more certain and uniform perforating action, not requiring any delicate adjustment of the spring 85 to insure the proper puncturing of the record-sheet without sticking.

To facilitate the striking of the stylus by cam member 81 in all positions of its back and forth movements radially of the record-sheet, I prefer to interpose a movable plate 90 between the cam member and the head 78 of plunger 79, such plate 90 being of an extent equal to the amplitude of swing of arm 69 so as to serve to transmit the blows of cam 81 to the stylus in all positions. As shown, plate 90 is pivoted upon pins 91 (Fig. 8).

I prefer to arrange the mechanism in such manner that the stylus 68 may be removed without requiring undue dismounting of the mechanism as a whole. In the present instance, sleeve 80 (Fig. 8) which supports the stylus, is detachably secured to arm 69, for example, screwed in, having a nut-shaped part 91 thereon, and top plate 61 is provided with an opening 92 (Fig. 2) sufficiently large to permit the insertion of a wrench through such opening to remove sleeve 80 and stylus. A cover plate 93 is detachably mounted upon top plate 61 over opening 92, for example, by screws 94 (Fig. 2), such cover plate being provided with a narrow slot 95 curved to correspond to the back and forth movements of the stylus. Thus the record-sheet will be properly supported adjacent the puncture point, and yet the stylus may be adjusted or removed at any time merely by taking off cover plate 93.

A platen or striking plate 94 (Figs. 2 and 6) is attached to cover plate 93 so as to be in front or above the record-sheet. The object of this platen is to prevent the record-sheet from moving away from the stylus when the latter advances thereby causing the needle to always pass the same distance through the record-sheet.

While a specific embodiment of the invention has been disclosed, it will be obvious that many changes may be made therein without departing from the spirit of the invention, as defined in the following claims:

I claim:

1. A recording mechanism for vehicles comprising record-making elements, a driving member, speed-changing motion-transmitting devices interposed between said driving member and said record-making elements, and a shaft having detachable sections interposed between said transmission devices and said record-making elements.

2. A recording mechanism for vehicles comprising record-making elements, a driving member, speed-changing motion-transmitting devices interposed between said driving member and said record-making elements, a supporting base for said motion-transmitting devices detachable from the casing, and a shaft including detachable sections interposed between said motion-transmitting devices and said record-making elements.

3. A recording mechanism for vehicles comprising a driving member, a casing, record-making elements and speed-changing gearing contained within said casing, a wall of such casing detachable therefrom and supporting said gearing, and a shaft including detachable sections interposed between said gearing and said record-making elements.

4. A recording mechanism for vehicles having record-making elements, comprising a reciprocatory stylus, a rotating cam member having a portion adapted to advance the stylus, and means for accelerating the rotary motion of such cam member during the period in which its above portion is advancing to move the stylus.

5. A recording mechanism for vehicles having record-making elements, comprising a reciprocatory stylus, a cam member having a portion adapted to advance the stylus, a rotary shaft carrying said cam member, means for rotating said shaft but permitting forward motion of the shaft relative thereto, and means for periodically accelerating the rotation of the shaft while the above-mentioned portion is advancing to move the stylus.

6. A recording mechanism for vehicles having record-making elements, comprising a reciprocatory stylus, a cam member having a portion adapted to advance the stylus, a rotary shaft carrying said cam member, a positively driven rotating member loosely mounted on said shaft, and having a part adapted to engage behind a part on the shaft to rotate the same, a crank carried by the shaft and a spring connected to said crank adapted to accelerate the rotation of the shaft when the above-mentioned portion of the cam is advancing to move the stylus.

7. The combination set forth in claim 6, together with means for moving its stylus back and forth in a plane transverse to its reciprocatory path, and a movably mounted bearing plate interposed between the stylus and the cam member, said plate being of sufficient extent to engage the stylus in all positions of its back and forth motion above-mentioned.

8. A recording mechanism for vehicles having record-making elements, comprising a stylus and means for moving the same back and forth in a plane transverse to its reciprocatory motion, a top plate associated with said record-making elements having an aperture of sufficient extent to permit access to the stylus therethrough, and a cover plate detachably connected to said top plate and overlying said aperture, said cover plate having therein a narrow slot conforming to the path of movement of the stylus, and being adapted to support a record-sheet.

9. A recording mechanism for vehicles having record-making elements, comprising a stylus, and means for detachably supporting the same, a top plate associated with said record-making elements having an aperture of sufficient extent to permit access to the stylus therethrough, a cover plate detachably connected to said top plate and overlying said aperture, said cover plate having therein a narrow slot adapted to receive the stylus, and being adapted to support a record-sheet.

10. A recording mechanism for vehicles having record-making elements comprising a reciprocatory stylus, a cam member having a definite path of travel and provided with a portion adapted to engage a part moving with the stylus to advance the latter during a part of its movement aforesaid, and means for accelerating the motion of such cam member during the period in which its portion is advancing the stylus.

11. A recording mechanism for vehicles having record-making elements comprising a reciprocatory stylus, an actuating member for said stylus having a definitely fixed back and forth path of travel, said member being operatively associated with said stylus to advance the latter a definite distance during each stroke, and means for accelerating the motion of said member during the part of its travel in which it is advancing the stylus.

12. A recording mechanism for vehicles having record-making elements comprising a reciprocatory stylus, a rotating cam member having a portion adapted to advance the stylus whereby the distance which the stylus advances is definitely determined according to the throw of the cam, and means for accelerating the rotary motion of such cam member during the time in which its above mentioned portion is advancing the stylus.

13. A recording mechanism comprising a reciprocating stylus, an actuating member therefor moving through a definite path of travel and having a projecting portion adapted to engage the stylus and actuate the same, said actuating member being moved through a part of its path of travel by the driving mechanism of said recording mechanism against the action of a spring, and being released from said driving mechanism during a remaining portion of its path of travel to enable the spring to accelerate the motion of said projecting portion past the stylus to actuate the latter a definite distance.

In testimony that I claim the foregoing, I have hereunto set my hand this 15th day of February, 1922.

CHARLES J. EVERETT.